United States Patent
Zhu et al.

(10) Patent No.: US 8,539,338 B2
(45) Date of Patent: Sep. 17, 2013

(54) COOPERATIVE RENDERING CACHE FOR MOBILE BROWSER

(75) Inventors: Bin Benjamin Zhu, Edina, MN (US); Aimin Pan, Beijing (CN); Kaimin Zhang, Hefei (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/083,835

(22) Filed: Apr. 11, 2011

(65) Prior Publication Data

US 2012/0260157 A1  Oct. 11, 2012

(51) Int. Cl.
*G06F 17/00* (2006.01)

(52) U.S. Cl.
USPC .......................... 715/234; 715/200

(58) Field of Classification Search
USPC .................................. 715/200, 234
See application file for complete search history.

(56) References Cited

U.S. PATENT DOCUMENTS

| | | | |
|---|---|---|---|
| 6,625,624 | B1 | 9/2003 | Chen et al. |
| 7,461,353 | B2 | 12/2008 | Rohrabaugh et al. |
| 7,685,260 | B2* | 3/2010 | Fukuda et al. ............ 709/219 |
| 7,900,149 | B2* | 3/2011 | Hatcher et al. ............ 715/760 |
| 7,962,547 | B2* | 6/2011 | Kern et al. ................ 709/203 |
| 8,091,030 | B1* | 1/2012 | Ballagh et al. ............ 715/738 |
| 8,175,922 | B2* | 5/2012 | Jones et al. .............. 705/14.73 |
| 2005/0055334 | A1* | 3/2005 | Krishnamurthy ............ 707/2 |
| 2006/0123330 | A1* | 6/2006 | Horiuchi et al. ........... 715/500 |
| 2007/0198715 | A1 | 8/2007 | Knowles et al. |
| 2008/0228772 | A1 | 9/2008 | Plamondon |
| 2010/0250706 | A1* | 9/2010 | Burckart et al. ........... 709/219 |
| 2010/0262780 | A1* | 10/2010 | Mahan et al. ............. 711/118 |
| 2010/0287462 | A1* | 11/2010 | Hauser ................... 715/241 |
| 2011/0258538 | A1* | 10/2011 | Liu et al. ................ 715/256 |

OTHER PUBLICATIONS

Anand et al., "SmartRE: An Architecture for Coordinated Network-wide Redundancy Elimination," SIGCOMM'09, Aug. 17-21, 2009, Barcelona, Spain, retrieved at <<http://pages.cs.wisc.edu/~akella/papers/sigcomm228-anand.pdf>>, 12 pages.

Caching in HTTP, retrieved on Nov. 26, 2010 at <<http://www.w3.org/Protocols/rfc2616/rfc2616-sec13.html>>, 20 pages.

Jing et al., "Client-Server Computing in Mobile Environments," Jun. 1, 1999, retrieved on Nov. 25, 2010 at <<http://www.accessmylibrary.com/article-1G1-58224706/client-server-computing-mobile.html>>, 4 pages.

DOMTRIS—retrieved on Nov. 26, 2010 at <<http://www.nihilogic.dk/labs/tetris/>>, 1 page.

Gnu Wget, retrieved on Nov. 26, 2010, at <<http://www.gnu.org/software/wget/>>, 2 pages.

(Continued)

*Primary Examiner* — Manglesh M Patel
(74) *Attorney, Agent, or Firm* — Lee & Hayes, PLLC (57) ABSTRACT

A cooperative rendering cache browser (CRC-Browser) for a mobile device may cooperatively manage cached content with a proxy server to reduce redundant transmissions of processed Web data. Additionally, the CRC-Browser may provide stateful, thin-client Web browsing to maintain synchronized information about rendering objects of a Web page. Further, the CRC-Browser may cache only stable and/or visible document object model (DOM) elements and communicate a list of IDs of the cached elements to the proxy. Such stateful thin-client browsers may be useful for reducing battery drain, poor responsiveness, and high wireless network costs of mobile Web browsing.

19 Claims, 6 Drawing Sheets

(56) References Cited

OTHER PUBLICATIONS

INFO: Address Space Layout of a Windows CE Process, Article 10: 326162—Last Review: Sep. 24, 2003—Revision: 3.0, retrieved on Nov. 26, 2010 at <<http://support.microsoft.com/?scid=kb%3Ben-us%3B326162&x=6&y=11>>, 2 pages.

Internet Explorer 8: Features, retrieved on Nov. 26, 2010 at <<http://www.microsoft.com/windows/internet-explorer/features/safer.aspx>>, 2 pages.

Kim et al., "pThinc: A Thin-Client Architecture for Mobile Wireless Web," International World Wide Web Conference Committee, WWW2006, May 23-26, 2006, Edinburgh, Scottland, retrieved at <<http://www.ncl.cs.columbia.edu/publications/www2006_fordist.pdf>>, pp. 1-10.

Klues et al., "Processes and Resource Management in a Scalable Many-core OS," In Proc. of the 2nd USENIX Workshop on Hot Topics in Parallelism (HotPar'10), Jun. 2010, retrieved at <<http://www.usenix.org/event/hotpar10/final_posters/Klues.pdf>>, 6 pages.

Koukoumidis et al., "Improving Mobile Search User Experience with SONGO" retrieved on Nov. 25, 2010 at <<http://research.microsoft.com/pubs/120317/SONGO_TR.pdf>>, 14 pages.

Meyerovich et al., "Fast and Parallel Webpage Layout," International World Wide Web Conference Committee, WWW 2010, Apr. 26-30, 2010 Raleigh, North Carolina, USA, retrieved at <<http://www.eecs.berkeley.edu/~lmeyerov/projects/pbrowser/pubfiles/playout.pdf>>, 10 pages.

Meyerovich et al., "Flapjax: A Programming Language for Ajax Applications," OOPSLA'09, Oct. 25-29, 2009, Orland Florida, USA, retrieved at <<http://www.cis.upenn.edu/~mgree/papers/oopsla2009_flapjax.pdf>>, 20 pages.

Muthitacharoen et al., "A Low-bandwidth Network File System," Proceedings of the eighteenth ACM symposium on Operating systems principles (c) 2001, retrieved at <<http://pdos.csail.mit.edu/papers/lbfs:sosp01/lbfs.pdf>>, 14 pages.

Nash et al., "Design Requirements for an AJAX and Web-Service Based Generic Internet GIS Client," 11th AGILE International Conference on Geographic Information Science, 2008, Univeristy of Girona, Spain, retrieved at <<http://plone.itc.nl/agile_old/Conference/2008-Girona/PDF/82_DOC.pdf>>, 6 pages.

Opera Mini & Opera Mobile browsers, retrieved on Nov. 24, 2010, at <<http://www.opera.com/mobile>>, 1 page.

Park et al., "Supporting Practical Content—Addressable Caching with CZIP Compression," ATC'07 2007 USENIX Annual Technical Conference on Proceedings of the USENIX Annual Technical Conference, 2007, retrieved at <<http://www.cs.princeton.edu/~sihm/papers/czip-usenix.pdf>>, 14 pages.

Radke et al, "Image Change Detection Algorithms: A Systematic Survey," NSF Center for Subsurface Sensing and Imaging Systems, Aug. 19, 2004, retrieved at <<http://www.ecse.rpi.edu/~rjradke/papers/radketip04.pdf>>, 32 pages.

Rivest, "The MD5 Message—Digest Algorithm," MIT Laboratory for Computer Science and RSA Data Security, Inc., Apr. 1992, retrieved at <<http://tools.ietf.org/pdf/rfc1321.pdf>>, 22 pages.

Spring et al., "A Protocol—Independent Technique for Eliminating Redundant Network Traffic," ACM SIGCOMM Computer Communication Review, vol. 30, Issue 4, Oct. 2000, retrieved at <http://citeseerx.ist.psu.edu/viewdoc/download?doi=10.1.1.8.8916&rep=rep1&type=pdf>>, 9 pages.

The WebKit Open Source Project, retrieved on Nov. 26, 2010 at <<http://webkit.org/>>, 1 page.

UCWEB one of the best browsers out there! , Aug. 1, 2009, retrieved on Nov. 25, 2010 at http://forum.xda-developers.com/showthread.php?t=543278>>, 6 pages.

W3C. Document Object Model (DOM), retrieved on Nov. 26, 2010, at <<http://www.w3.org/DOM/>>, 3 pages.

Welcome to Skyfire, retrieved on Nov. 26, 2010, at <<http://www.skyfire.com/>>, 2 pages.

Zhang et al., "Smart Caching for Web Browsers," International World Wide Web Conference Committee, WWW2010, Apr. 26-30, 2010, Raleigh North Carolina, USA, retrieved at <<http://research.microsoft.com/pubs/130860/Smart-Caching-for-Web%20Browsers.pdf>>, 10 pages.

zlib Home Site, retrieved on Nov. 26, 2010, at <<http://www.zlib.net>>, 5 pages.

\* cited by examiner

COOPERATIVE RENDERING CACHE FOR MOBILE BROWSER

BACKGROUND

With the ubiquity of high-bandwidth wireless networks, users increasingly complement their Personal Computers (PCs) with mobile phones to deliver pervasive access to the Internet. Additionally, many rich Web applications have been developed that rival traditional desktop applications. However, mobile phones running native Web browsers still deliver inferior performance to and support fewer features and functionalities than their PC counterparts.

Additionally, mobile phones often download excessive amounts of Web content originally designed for PCs. As such, developers have designed mobile Web applications and thin-client browsers. However, mobile Web applications are often inadequate substitutes. Further, thin-client browsers are stateless and, thus, often download full display updates in response to minor changes at the user device. Unfortunately, mobile browsers fail to alleviate the fast battery draining, poor responsiveness, and high wireless network costs of mobile Web browsing.

BRIEF SUMMARY

This summary is provided to introduce simplified concepts for a cooperative rendering cache browser (CRC-Browser), which is further described below in the Detailed Description. This summary is not intended to identify essential features of the claimed subject matter, nor is it intended for use in determining the scope of the claimed subject matter. Generally, a CRC-Browser, as described herein, involves cooperatively maintaining, between a stateful thin-client browser of a mobile device and a proxy server, synchronized information regarding rendering objects to reduce redundant data transmissions and improve responsiveness.

In one embodiment, a thin-client Web browser of a client device may cache only rendering objects associated with stable document object model (DOM) elements processed and received from a proxy server over a wireless network. The client device may present Web content via the Web browser based on the cached Web data and/or based on processed Web content received from the proxy server. Additionally, in some aspects, the client device and the proxy server may cooperatively manage the cached content by synchronizing with one another. The client device may also maintain state information regarding a Webpage session. Further, in some aspects, the client device and the server may share a cached image identifier (ID) list (CI2L) that contains a list of entries made up of IDs of the rendered bitmaps of rendering objects cached at the client side for a given session (which may be provided to the server by the client device at the beginning of a Webpage session). Determining whether rendering objects are to be transmitted to the client device may be based at least in part on comparing IDs of the DOM elements against the CI2L.

In another embodiment, a client device may receive a rendering tree from a proxy server. The rendering tree may include rendered bitmaps and associated IDs of rendering objects. Additionally, in some aspects, the client device may receive, from the proxy server, an indication of which rendering objects or their associated DOM elements are stable, and may cache only the stable rendering objects. The client device, in one aspect, may also render Web content based at least in part on the received rendering tree or the cached rendering objects. Further, the client device may also construct a CI2L with entries made up of IDS of the cached rendered images of DOM elements and may send the CI2L to the proxy server at the beginning of a Webpage session.

In another embodiment, a proxy server may process hypertext markup language (HTML) data to form a rendering tree and synchronize the rendering tree with a client device. Additionally, in some aspects, the proxy server may receive a CI2L from the client device that indicates which rendering objects are cached, and may send new rendering objects to the client device that do not match the rendering objects on the CI2L. Further, in at least one aspect, the proxy server may indicate whether a rendering object is stable or volatile by setting a status bit of each node in the rendering tree to either a one or a zero.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed, in part, to techniques for implementing a CRC-Browser, or other thin-client browser, that cooperatively manages rendering objects with a proxy server. This disclosure is also related to providing a stateful thin-client mobile Web browser for a mobile device, such as the CRC-Browser, to leverage the computing power of a proxy server to process Web content for the mobile device (e.g., a mobile phone). In this way, the battery life of a mobile device may be saved, responsiveness of mobile Web browsing may be improved, and mobile network costs may be reduced.

In one aspect, a client device may cache rendered bitmaps (also referred to as images), which may be compressed, of stable rendering objects associated with DOM elements to eliminate redundant transmissions of the rendered bitmaps in subsequent in-session and cross-session Web browsing. These cached images may be identified by the proxy server and, in some instances, only new and modified DOM element images may be sent to the client device.

Additionally, in some aspects, both the client device and the proxy server may cooperatively maintain the information about the rendering objects that the client device has cached, and the rendering information for each cached image, to minimize the communications between the two. As such, unchanged rendering objects may not be re-sent to the client device, resulting in more efficient use of the network bandwidth between the mobile device and the proxy server. Additionally, in some aspects, the proxy server may be stateless for cross-session Web browsing, such that when a session ends, the proxy server may delete data related to the session. In this way, a mobile device may roam from one server to another when browsing different Web pages.

In some aspects, the CRC-Browser may cache and manage rendered images of DOM elements. As such, the proxy server may merely send the rendered images of changed or new DOM elements instead of a full display. The CRC-Browser may manage synchronized in-session rendering trees on both parties (i.e., the client device and the proxy server) to record the rendering information of DOM elements. Additionally, in at least one aspect, the browser may employ a layered-rendering algorithm at the thin-client device to process rendering objects and merge them into a display on the screen of the mobile device.

Additionally or alternatively, in some aspects, the CRC-Browser may cache only stable rendering objects. Objects may be uniquely identified by their collision-free hashes so that the proxy server may deduce what objects the client device has cached without actually sending the objects, resulting in further reduced communications between the two parties. In one example, dynamic indexing of cached objects may reduce the amount of data requested to reference cached objects. As such, cache preloading may improve the responsiveness of the browser as well. Additionally, in one aspect, the proxy server may perform most of the management tasks such as, but not limited to, validation checking of cached objects, calculation of object IDs, construction of rendering trees, etc., thus, further reducing computations by the client device.

Figure 1:
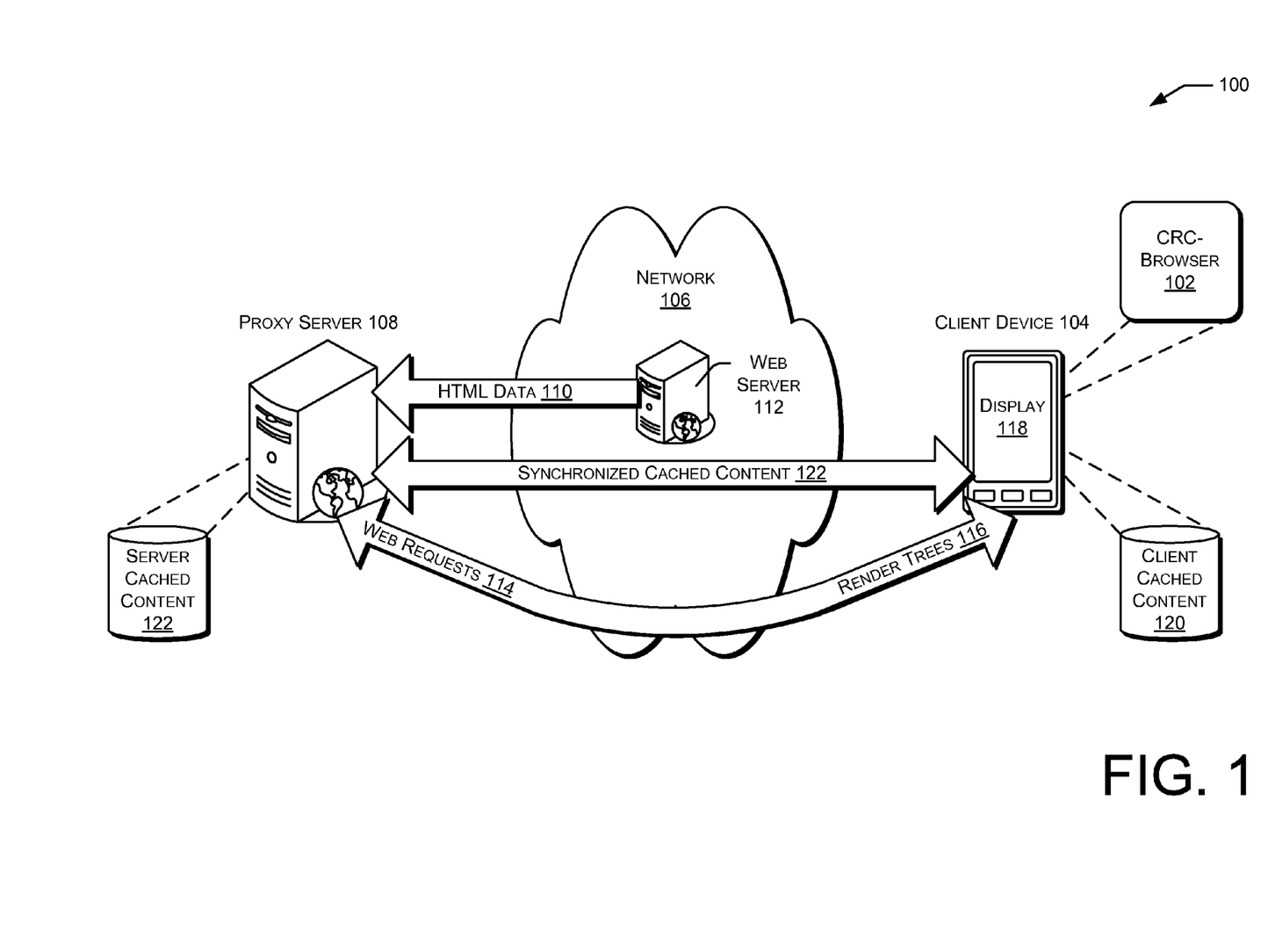
FIG. 1 is a schematic diagram of an illustrative architecture for implementing a CRC-Browser.

FIG. 1 depicts an illustrative example architecture 100 for implementing a CRC-Browser 102 of a client device 104 as briefly described above. By way of example only, the client device 104 may be a cellular telephone, handheld GPS device, tablet, laptop, desktop computer, or any other computing device that may perform Web browsing. In one example, the client device 104 may be a mobile phone that can connect to a network 106, such as the Internet, via Wi-Fi™ or a cellular, or other radio network, service.

Additionally, by way of example only, a proxy server 108 may also connect to the network 106 and, as such, may communicate with the client device 104 for aiding in at least some implementations of the CRC-Browser 102. In one aspect, the proxy server 108 may be responsible for receiving Web data 110 from a Web server 112 in response to Web requests 114 from the client device 104. The proxy server 108 may also process the Web data 110. In this way, the proxy server 108 may perform traditional Web browsing functions such as, but not limited to, parsing the HTML data, representing parsed Web data as DOM trees, generating style properties for DOM elements, calculating layout information for DOM elements, and preparing rendering trees. Additionally, in one example, the proxy server 108 may also determine an identifier (ID) for each rendering object by producing a hash for the object. Thus, in response to Web requests 114, the proxy server 108 may also send the rendering trees 116 to the client device 104 for displaying the Web page on the display 118 of the client device 104.

In some aspects, rendered bitmaps of DOM elements, referred to as DOM element images (or element images), are cached as compressed images at the client device 104. Additionally, the IDs for each DOM element image may also be cached at the client device 104. As seen in FIG. 1, the client device 104 may include a client cached content data store 120 for storing the cached DOM element images and associated IDs at the client device 104.

Additionally, in one aspect, both the proxy server 108 and the client device 104 may manage the rendering information for a current session. That is, the proxy server 108 and the client device 104 may synchronize 122 the cached content so that during a single Webpage session, the data in the client cached content data store 120 matches the information saved in memory or storage 126 of proxy server 108. In one embodiment, CI2L(s) is sent from client device 104 to proxy server 108 with Web requests 114, and synchronized 122 on both client device 104 and proxy server 108.

FIG. 1 provides a simplified example of a suitable architecture 100 for implementing a mobile, thin-client, Web browser like the CRC-Browser 102 described above. However, other configurations are also possible. For example, the functionalities of the client device 104 may be implemented almost entirely on the proxy server 108, or other remote server (e.g., a cloud edge server), such that the client device 104 may be a complete thin-client device configured to receive information solely from one or more remote servers and display on its screen. Additionally, while one proxy server 108, one network 106, and one Web server 112 are shown, any number of proxy servers, networks, or Web servers may be utilized to implement the browser described.

Illustrative Architectures

Figure 2:
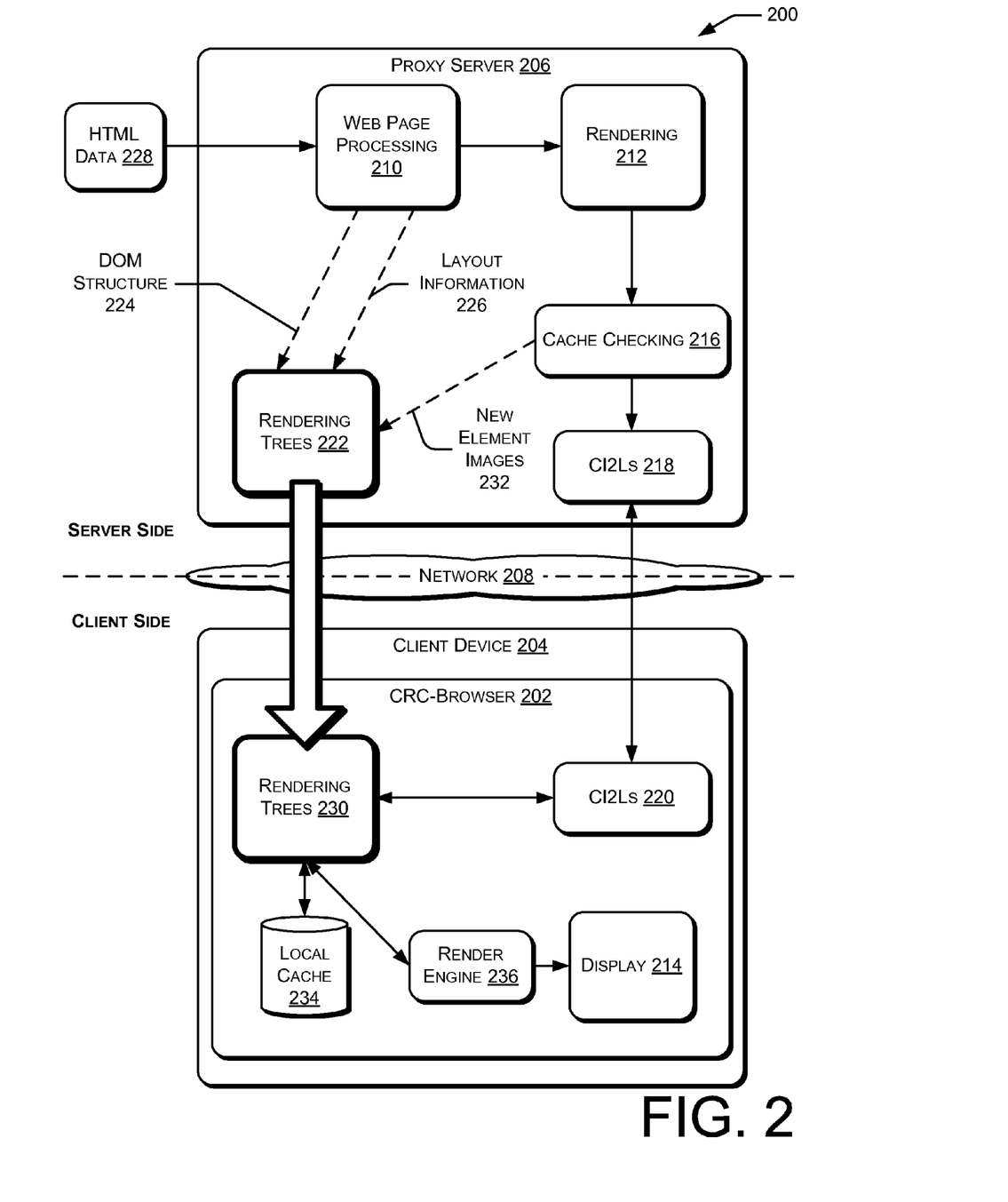
FIG. 2 is a schematic diagram illustrating details of an illustrative architecture for implementing synchronization between a proxy server and one illustrative CRC-Browser of a client device.

FIG. 2 depicts an illustrative system 200 for implementing a CRC-Browser 202 similar to the CRC-Browser 102 of FIG. 1. While FIG. 2 describes the system 200 implemented within client device 204; alternatively, as noted above, a remote server may implement system 200 as an in-cloud service. In one aspect, a full-fledged Web browser engine is employed at the server side by a proxy server 206 to process a Web page for the client device 204 over a network 208. As such, the proxy server 206 may perform Web page processing 210 like a traditional Web browser, and may perform rendering 212 of each visible DOM element independently on a virtual display instead of a physical screen, such as on display 214 of the client device 204.

In one example, the proxy server 206 may also compute IDs of the bitmaps of each visible DOM element for a processed Web page. The proxy server 206 may then perform cache checking 216 to compare the computed IDs with the IDs in a server-side Image ID List (CI2L) 218 received from and synchronized with the client device 204. In one aspect, the server-side CI2L 218 is merely a copy of a client-side CI2L 220 stored by the client device 204. As such, the server-side CI2L 218 and the client-side CI2L 220 may contain the IDs of cached element images for the current Web page. In this way, the proxy server 206 may deduce which element images the client already has received and cached. Then, the proxy server 206 may only send bitmaps of modified or new DOM elements to the client device 204 along with their respective IDs and types (e.g., stable or volatile).

In one aspect, the proxy server 206 may construct a DOM tree 224 for each frame in a current Web page, and then compute its associated rendering tree 222. In one example, a rendering tree 222 is a reduced DOM tree which only contains layout information 226 which may include properties of the element images for visible DOM elements.

Additionally, in some aspects, a simplified DOM tree, referred to as a rendering tree 222, may represent the rendering information of a Web page received by the proxy server as Web data 228. Each node in a rendering tree 222 may represent a visible DOM element, but may contain only the rendering information including the bounding box of the element, the z-coordinate, a reference to the rendered image of the element, status bits to indicate whether the DOM element is stable or volatile, an input element or not, and also the type of an input element. In one implementation, a DOM element that is never visible may be dropped from the rendering tree 222.

By way of example only, some Web pages are made up of one or more frames. Each frame may have a separated DOM tree 224 and each DOM tree may be associated with a rendering tree 222. Thus, a Web page may be associated with a set of rendering trees 222. In one aspect, the proxy server 206 may construct DOM trees 224 and their corresponding rendering trees 222 at the beginning of a Webpage session. The set of rendering trees 222 may be sent to the client device 204 as rendering trees 230 in a lazy transmission mode. In one embodiment, both the proxy server 206 and the client device 204 may maintain synchronized rendering trees 222 and 230, respectively, during the lifespan of the current Webpage session.

In one example, when the current Webpage session ends, the rendering trees 222 and 230 associated with the session are deleted at both the server side and the client side. However, during a session, the proxy server 206 may identify modified and new/deleted rendering tree elements by cache checking 216 if any changes to the content, style properties, layout information, or location of visible DOM elements in a DOM tree has occurred. Additionally, the proxy server 206 may update the rendering trees 222 with new element images 232 if any such changes have occurred. In one example, an update to rendering trees 222 is sent to the client device 204 to update rendering trees 230 in a lazy transmission mode as well. After receiving an update of rendering trees 230, the client device 204 may merge the update to its rendering trees 230 to synchronize them with the rendering trees 222 at the server side.

Further, while the client device 204 may send all rendering trees 230 to the render engine 236 to cause display on display 214, in some aspects, the CRC-Browser 202 may only store images of stable nodes from the rendering trees 230 in local cache 234. However, volatile rendering nodes may not be cached due to frequent changes. For example, plug-in objects such as Flash objects may not be cached. In one implementation, a specific status bit may be set or unset (i.e., set to one or zero) by the proxy server 206 for each node in the rendering tree 230 to indicate whether the element image is to be cached. Accordingly, the client device 204 may take actions accordingly (e.g., cache or not cache the element image) based on the status bit received from the proxy server 206.

However, particular treatment may be appropriate in the following examples:
Animation images such as GIF images. Like plug-ins, an animated image may change frequently but periodically. As such, the thin-client CRC-Browser 202 may be able to render images including animated GIF images. Therefore, an animation image is treated as if it were an element image and may be cached directly.
Blank images. Some visible DOM elements may actually have no meaningful content on its element image. For example, in the following piece of HTML code:

```
<div id="container">
    <p>test</>
    <p>web page</>
</div>
``` where div is a container element for the two p elements and, as such, is just a blank image with a default background.

In this example, the element image has no visual impact on a rendered display and can be easily detected by scanning its pixel values. Thus, there may be no need to store or transmit these blank images. As such, a particular status bit may be used to indicate if a rendering tree node has a blank image. This bit may be set or unset by the proxy server 206 to indicate whether the client device 204 is to cache the blank image.

Illustrative Indexing and Caching Techniques

In some aspects of utilizing the CRC-Browser 202, each rendering node may contain a reference to its element image. Thus, the CRC-Browser 202 may employ a dynamic indexing scheme for referencing element images in rendering tree nodes. In one example, as noted above, both the client device 204 and the proxy server 206 may maintain a CI2L, respectively, for each rendering tree. Additionally, each cached element image may be uniquely referenced by its indexing in the CI2L. For example, a reference index n in a rendering tree node means that its element image is the one identified by the n-th ID in the CI2L. Additionally, the number of bits of an index may depend on the number of different cached element images for a rendering tree in a Webpage session, which may be small. For example, an index may be 8, 12, or 16 bits. In one embodiment, one side (e.g., the server side or the client side) may select the size of the index and inform the other side. During a Webpage session, the proxy server 206 may modify the size and the references on both sides can be updated accordingly.

In some aspects, like rendering trees 222 or 230, CI2Ls 218 may be maintained only for the current Webpage session. As such, the initial CI2L 220 may be constructed by the client device 204 and sent to the proxy server 206 with the URL request to indicate the element images cached at the client device 204 for the URL. Thus, when the proxy server 206 receives a new cacheable element image that has an ID that is not in the server-side CI2L 218, the ID of the new element image may be appended to the server-side CI2L 218 of the rendering tree. New cacheable element images 232 and their IDs may then be sent to the client device 204 along with updates to the rendering trees 222 and 230. Additionally, non-cached objects may be identified by their corresponding nodes in the rendering tree. The client device 204 may then cache the received new element images 232 in the local cache 234 and may append the received IDs to the client-side CI2Ls 220 to keep synchronized with the proxy server 206.

In some aspects, cross-session caching may be utilized by the CRC-Browser 202. For example, when a current Webpage session ends, the client device 204 may preserve cached element images for future usage while the proxy server 206 may delete all the data associated with the session. That is, the proxy server 206 may be stateless for different Webpage sessions. In this way, the cross-session cache at the client device 204 may eliminate transmissions of redundant data between two subsequent visits of the same URL since Web pages typically do not change severely if the two visits are not too far apart in time.

In some implementations, only the cacheable element images and their IDs are cached locally in the client device 204 for cross-session caching. As such, rendering trees 230 may be deleted when a Webpage session ends. Additionally, all the cached elements and their IDs may be organized according to their URLs. In one example, if a Web page contains frames from different URLs, links to the cached data from these URLs may be cached for the URL associated with the Web page. Further, cached images may be compressed to reduce potential storage.

In one aspect, cached data may be deleted if it is unlikely to be used. By way of example only, an expiration time such as two weeks may be set for cached data. When cached data is unused for a time beyond the expiration time, the cached data may be deleted form the cache. In one embodiment, different expiration times can be assigned to different sets of cached data. Additionally, an aging mechanism may also be introduced to rein in the size of the cache. For example, a Least Recently Used (LRU) aging mechanism may be used in which an element that is least recently used may be deleted from the cache when cache size reduction is requested. Alternatively, in some examples, when a cached element image is used to render a display 214, its weight may be increased by 1. In this non-limiting example, element images with heavier weights may have a higher priority to be preloaded into memory when their associated URLs are requested.

Further, in one aspect, cross-session cache data may be spread to different types of storage (e.g., main memory, storage, external storage, etc.). Additionally, the IDs of the cached element images may require less storage and may be stored in a medium that can be retrieved relatively quickly. As such, a pre-fetch policy may be applied based on a prediction that a URL is likely to be used next. The cached element images, on the other hand, may use larger storage space and stored on an external storage media, and may be loaded into memory before being used.

Thus, to improve responsiveness, the CRC-Browser 202 may employ a preloading technique to bring the cached element images into memory before they are accessed. For example, when the client device 204 requests a Web page, the client device 204 may send the page loading request and the associated CI2Ls to the proxy server 206. However, the client device 204 may stay almost idle until receiving the first update from the proxy server 206. Further, the CRC-Browser 202 may exploit this idle time by preloading the cached element images associated with the requested Web page and its linked URLs into memory. In one example, however, if the memory is limited, only the most recently used element images may be preloaded and decoded. Since these images have been recently used, they are more likely to be used again.

In one example, the preloading may stop when:
  All the images are preloaded and decoded;
  The client device 204 receives the first update of the rendering trees form the proxy server 206. After having finished processing the update, the client device 204 may resume preloading the remaining images; or
  The allocated memory is full.

Preloading may significantly improve the responsiveness of the client device 204.

In some aspects, in-session caching may be utilized by the CRC-Browser 202. For example, when the client device 204 requests a new URL, the CI2Ls 220 of the cached element images of the URL and the CI2Ls 220 of the linked URLs may be sent to the proxy server 206. The proxy server 206 may then acquire the Web page of the URL from cached data instead of the server of the Website and build the DOM trees and rendering trees 222 for the Web page. The proxy server 206 may then compute the IDs of the cacheable element images and compare them with the IDs in the received CI2Ls 218. If an identical ID in a CI2L 218 is detected, this may indicate that the client device 204 has the element image in its local cache 234, and the proxy server 206 may not need to send the element image.

Additionally, after identifying new element images 232, the proxy server 206 may send the portion of the rendering trees 222 and the new element images 232 (and their IDs) under an extended scope of display to the client device 204. In one example, an extended scope of display is an extension of the current display of the client device 204 by including a buffer surrounding the current display. In some examples, this prefetching of the surrounding region may improve responsiveness when a user scrolls the display 214. Alternatively, when a user scrolls at different portions of the Web page, the client device 204 may incrementally construct the rendering trees 230 and cache element objects. Additionally, as described above, when a cached element image is used to render a display 214, its weight may be increased by 1 or its usage may be updated with the LRU aging mechanism. Further, in one non-limiting example, element images with heavier weights may have a higher priority to be preloaded into memory when their associated URLs are requested.

Illustrative Layered Rendering and Privacy Issues

In some aspects, a client device 204 such as a mobile phone may typically display a portion of a Web page at a time. After receiving updates on the rendering trees 230 and element images, the client device 204 may request to identify the nodes in the rendering trees 230 that intersect with the current display window. In one example, the CRC-Browser 202 may start with the uppermost rendering tree 230 associated with the main frame of the Web page and traverse the rendering tree 230 in pre-order. When a frame node is found, the CRC-Browser 202 may start to apply the same traversing procedure on corresponding rendering trees 230. When a normal node is found to intersect with the current display window, its element image may be decoded and marked with the information of its frame and z-coordinate (i.e., the layer).

After all the rendering trees 230 have been traversed, the marked nodes may then be grouped according to their frames, and each frame may be ordered according to their z-coordinates, i.e., layers. These frames may then be rendered from the background frame to the foreground frame according to their z-coordinates. When rendering a frame, the marked nodes in that frame may be rendered, also from the background to the foreground according to their z-coordinates. Additionally, in rendering a marked node, the portion within the visible region of its frame may be rendered. However, the blocked part may be ignored. If there is blocked portion for any node in a frame, a scrolling bar may be added to the frame to indicate that a user can scroll the windows of the frame to see the blocked portion. The result for the current display may be produced when all the marked nodes have been rendered in the above layered rendering method. As such, each frame may be scrolled independently if any blocked portion for that frame exists.

As mentioned above, the proxy server 206 may render each rendering tree node independent to generate its element image. These element images may then be sent to the client device 204 in a lazy transmission mode if they are not yet cached by the client device 204. Additionally, also mentioned above, in a lazy transmission mode, only the data within the extended scope of the current display window (i.e., the current display window plus its buffer region) may be sent to the client device 204.

Further, to save bandwidth and storage, each element image may be compressed before transmitted or cached. These compressed images may also be decoded before being rendered to display at the mobile device 204. Additionally, when a compressed image is requested for rendering, it may be decoded and loaded into the buffer. All the decoded images may be buffered in the memory for faster access. When the allocated buffer is close to full, some decoded images may be deleted. In one embodiment, the Least Recently Used (LRU) aging mechanism can be used to determine which images are deleted when deletion is needed. Alternatively, as noted above, in some examples, element images with heavier weights may have a higher priority to be preloaded into memory when their associated URLs are requested.

Additionally, there are two potential privacy issues for the CRC-Browser 202. First, since the proxy server 206 acts as a middle man between the client device 204 and a Web server such as Web server 112 of FIG. 1, it may store the information that a user browses. Second, due to the stateful nature of the CRC-Browser 202, the client device 204 may preserve the cached element images to eliminate cross-session redundancies and, thus, anyone who has access to the mobile phone might be able to retrieve the cached element images.

In one example, to mitigate the first problem, the CRC-Browser 202 may partition the proxy server 206 into two types: public proxy servers and private proxy servers. A public proxy server may be used to process insensitive Web content and a private proxy server may be used to process sensitive Web content. A user can select the machines, for example, the PCs at his/her office and home, as his/her private proxy servers. To start a private proxy service, a user or his/her mobile phone may identify himself/herself or the client device 204 to a listing server which runs a public service. In one example, this may be done by automatically using a pre-registered hardware ID of the mobile phone. The listing server may then retrieve the pre-registered list of private proxies, find a live private proxy, and direct communications to that proxy server, which may run behind a firewall. The client device 204 may then perform a mutual authentication protocol with the private proxy to authenticate to each other and to build a secure channel between them before starting the proxy service. Additionally, the listing server may direct the proxy request to different servers based on privacy settings, availability, load balance, etc.

In another example, the second issue can be mitigated by using option settings and encryption within the client device 204. In one aspect, by default, the CRC-Browser 202 may not perform cross-session caching at the client side for HTTPs connections, and a user may configure whether cross-session caching is to be used for accessing certain Web sites. Additionally, encryption of cached cross-session data may be used. For example, a user may authenticate himself/herself to the client device 204 before using cross-session caching for browsing Web sites.

Additionally, in one example, where the client device 204, the CRC-Browser 202, or the proxy server 206 shares user and/or application data, the architecture 200 may provide opt-in and/or opt-out functionality. Additionally, in one instance, prior to any user information being collected and/or shared amongst the devices, the user whose information is to be collected will be notified and given the ability to opt-out prior to any data collection. Further, enhanced security measures may be employed in order to protect the user and/or application data.

FIG. 2 provides a simplified example of a suitable architecture 200 for implementing a CRC-Browser and cooperatively managed proxy server according to the present disclosure. However, other configurations are also possible. For example, other modules, processors, interfaces, and display devices may be used. Additionally, while FIG. 2 shows a single proxy server 206, any number of proxy servers, remote servers, or Web servers may be utilized.

Illustrative Computing Environments

Figure 3:
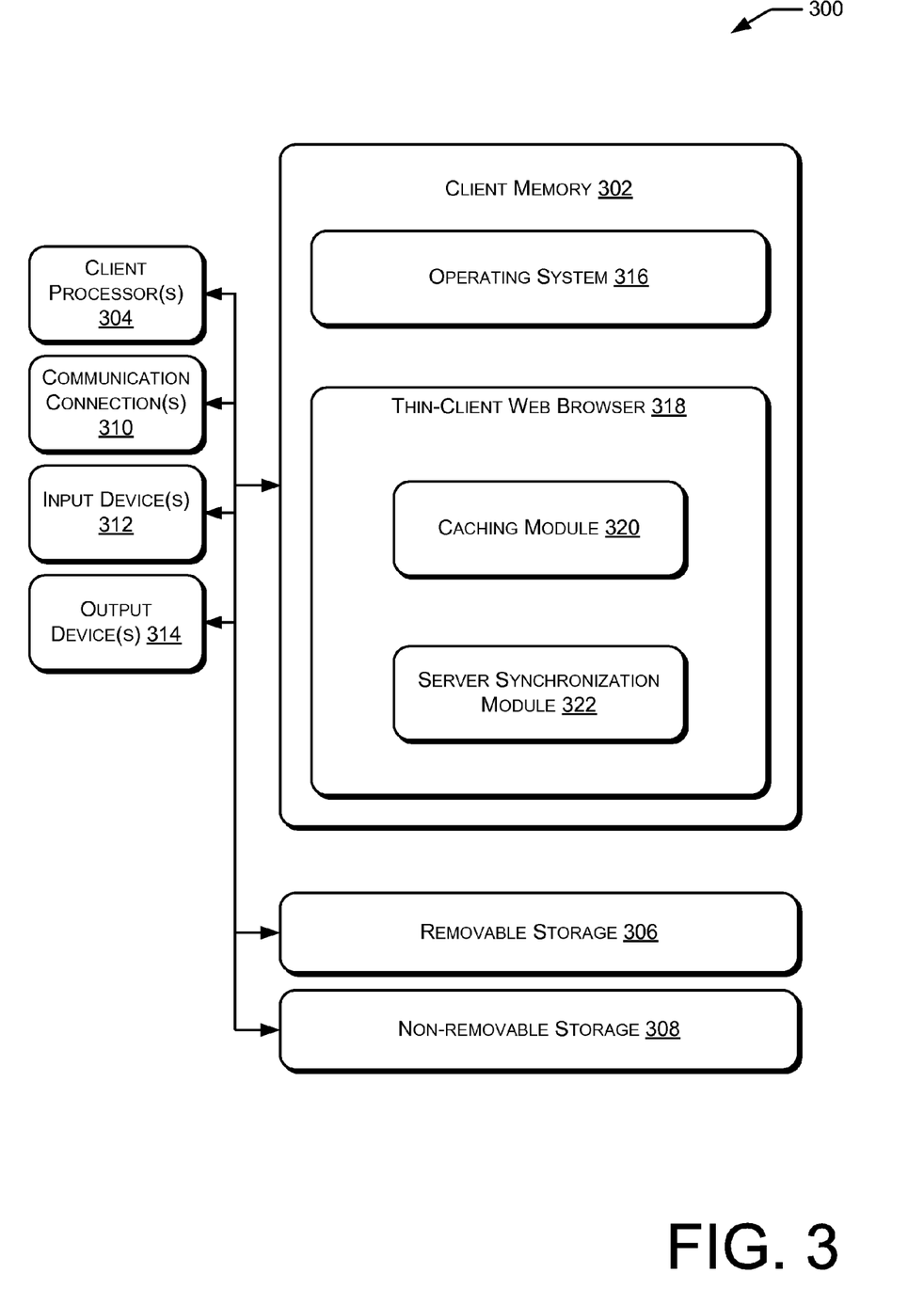
FIG. 3 is a block diagram of a computer environment showing an illustrative client system with which a CRC-Browser may be implemented.
Figure 4:
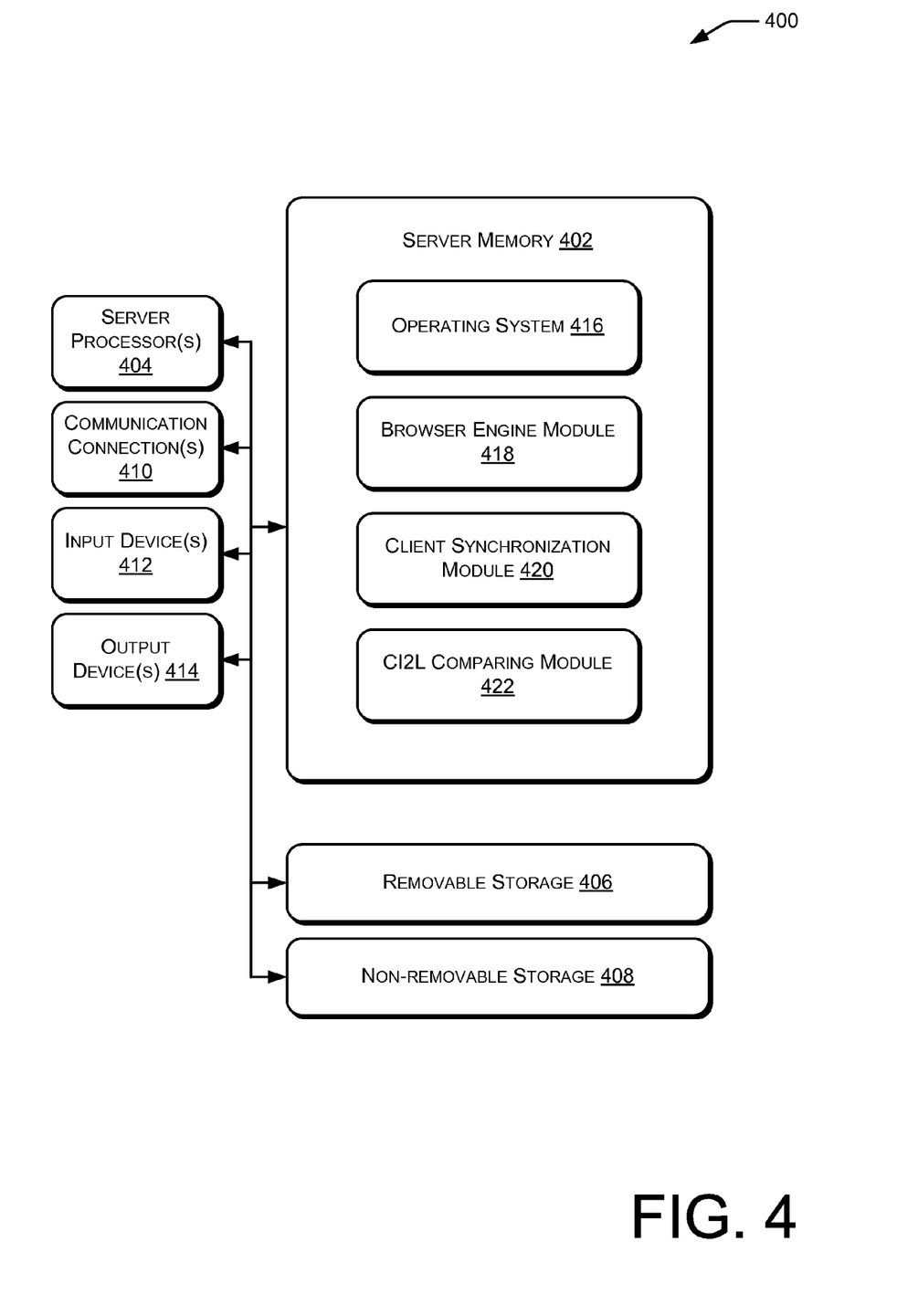
FIG. 4 is a block diagram of a computer environment showing an illustrative server system for cooperatively managing cached content with a CRC-Browser of a client device.

FIGS. 3 and 4 provide illustrative overviews of two computing environments 300 and 400, in which aspects and features disclosed herein may be implemented. First, the computing environment 300 may be configured as any suitable computing device capable of implementing a client device with a CRC-Browser, and accompanying methods, such as, but not limited to those described with reference to FIGS. 1 and 2. Additionally, the computing environment 400 may be configured as any suitable computing device capable of implementing a proxy server for cooperatively managing cached Web content with the client device of FIG. 3, and accompanying methods, such as, but not limited to those described with reference to FIGS. 1 and 2. By way of example and not limitation, suitable computing devices may include mobile phones, slate computers, netbooks, personal computers (PCs), servers, server farms, datacenters, or any other device capable of storing and executing all or part of the suggestive mapping system.

In one illustrative configuration, as seen in FIG. 3, a client computing environment 300 comprises at least a memory 302 (including a cache memory) and one or more processing units (or processor(s)) 304. The processor(s) 304 may be implemented as appropriate in hardware, software, firmware, or combinations thereof. Software or firmware implementations of the processor(s) 304 may include computer-executable or machine-executable instructions written in any suitable programming language to perform the various functions described.

Memory 302 may store program instructions that are loadable and executable on the processor(s) 304, as well as data generated during the execution of these programs. Depending on the configuration and type of computing device, memory 302 may be volatile (such as random access memory (RAM)) and/or non-volatile (such as read-only memory (ROM), flash memory, etc.). The computing device or server may also include additional removable storage 306 and/or non-removable storage 308 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 302 may include multiple different types of memory, such as static random access memory (SRAM), dynamic random access memory (DRAM), or ROM.

Computer-readable media includes computer storage media but excludes communications media (e.g., a modulated data signal, such as a carrier wave, or other transmission mechanism).

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing environment 300 may also contain communications connection(s) 310 that allow the computing environment 300 to communicate with a stored database, another computing device or server, user terminals, and/or other devices on a network. The computing environment 300 may also include input device(s) 312, such as a keyboard, mouse, pen, voice input device, touch input device, etc., and output device(s) 314, such as a display, speakers, printer, etc.

Turning to the contents of the memory 302 in more detail, the memory 302 may include an operating system 316 and one or more application programs or services for implementing a CRC-Browser including a thin-client Web browser 318. As noted above, thin-client Web browser 318 may be configured to receive rendering trees from a proxy server, such as the proxy server 206 of FIG. 2. Additionally, the thin-client Web browser 318 may also cause display of Web pages via a display device of the computing environment 300.

As part of the thin-client Web browser 318, the memory 302 may further include a caching module 320. The caching module 320 may be configured to cache (i.e., store in a cache memory location) data of visible and/or stable DOM elements received from the proxy server as noted above. In some aspect, the client computing environment 300 may only cache data of visible DOM elements, in some aspect it may only cache data of stable DOM elements, and in some aspects it may only cache data of DOM elements that are both visible and stable. Additionally, in some aspects, the caching module 320 may cache data of DOM elements based on a status bit of the DOM node that was previously set by a proxy server.

Memory 302 may also include a server synchronization module 322 that may be configured to synchronize with a proxy server, such as proxy server 206 of FIG. 2. In some aspects, the server synchronization module 322 may synchronize with a proxy server by obtaining a CI2L and providing the CI2L to the proxy server.

FIG. 4 provides an illustrative server computing environment 400 that comprises at least a memory 402 and one or more processing units (or processor(s)) 404. The processor(s) 404 may be implemented as appropriate in hardware, software, firmware, or combinations thereof. Software or firmware implementations of the processor(s) 404 may include computer-executable or machine-executable instructions written in any suitable programming language to perform the various functions described.

Similar to that of computing environment 300 of FIG. 3, memory 402 may store program instructions that are loadable and executable on the processor(s) 404, as well as data generated during the execution of these programs. Depending on the configuration and type of computing device, memory 402 may be volatile (such as random access memory (RAM)) and/or non-volatile (such as read-only memory (ROM), flash memory, etc.). The computing device or server may also include additional removable storage 406 and/or non-removable storage 408 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 402 may include multiple different types of memory, such as static random access memory (SRAM), dynamic random access memory (DRAM), or ROM.

The computing environment 400 may also contain communications connection(s) 410 that allow the computing environment 400 to communicate with a stored database, another computing device or server, user terminals, and/or other devices on a network. The computing environment 400 may also include input device(s) 412, such as a keyboard, mouse, pen, voice input device, touch input device, etc., and output device(s) 414, such as a display, speakers, printer, etc.

Turning to the contents of the memory 402 in more detail, the memory 402 may include an operating system 416 and one or more application programs or services for implementing a proxy server that cooperatively manages cached content of a mobile device, including a browser engine module 418. As noted above, browser engine module 418 may be configured to receive Web data from Web servers, process the HTML data into DOM trees and rendering trees, and provide the processed content to a client device, such as the client device 204 of FIG. 2. Additionally, the browser engine module 418 may also calculate IDs for some types of data such as rendered images related to each DOM element of the rendering trees and indicate, by setting or unsetting a bit of each DOM element, whether the DOM elements are to be cached by the client device. In some aspects, the server may be configured to store received and/or processed Web content in its cache for future usage.

The memory 402 may further include a client synchronization module 420. The client synchronization module 420, much like the server synchronization module 322 of FIG. 3, may be configured to synchronize the rendering trees with the client device. In some aspects, the client synchronization module 420 may provide rendering trees to the client device. Additionally, in some aspects, the client synchronization module 420 may receive CI2Ls from the client device to indicate which DOM elements whose rendered images have been, or are being, cached at the client device.

Memory 402 may also include a CI2L comparing module 422 that may be configured to compare the IDs of data of incoming DOM nodes with the IDs contained in the synchronized CI2Ls. In some aspects, the CI2L comparing module 422 may compare each ID with the IDs of the CI2Ls stored in the server computing environment 400 or it may compare an index of the DOM element with an index of the CI2L.

Illustrative CRC-Browser and Proxy Server Processes

Figure 5:
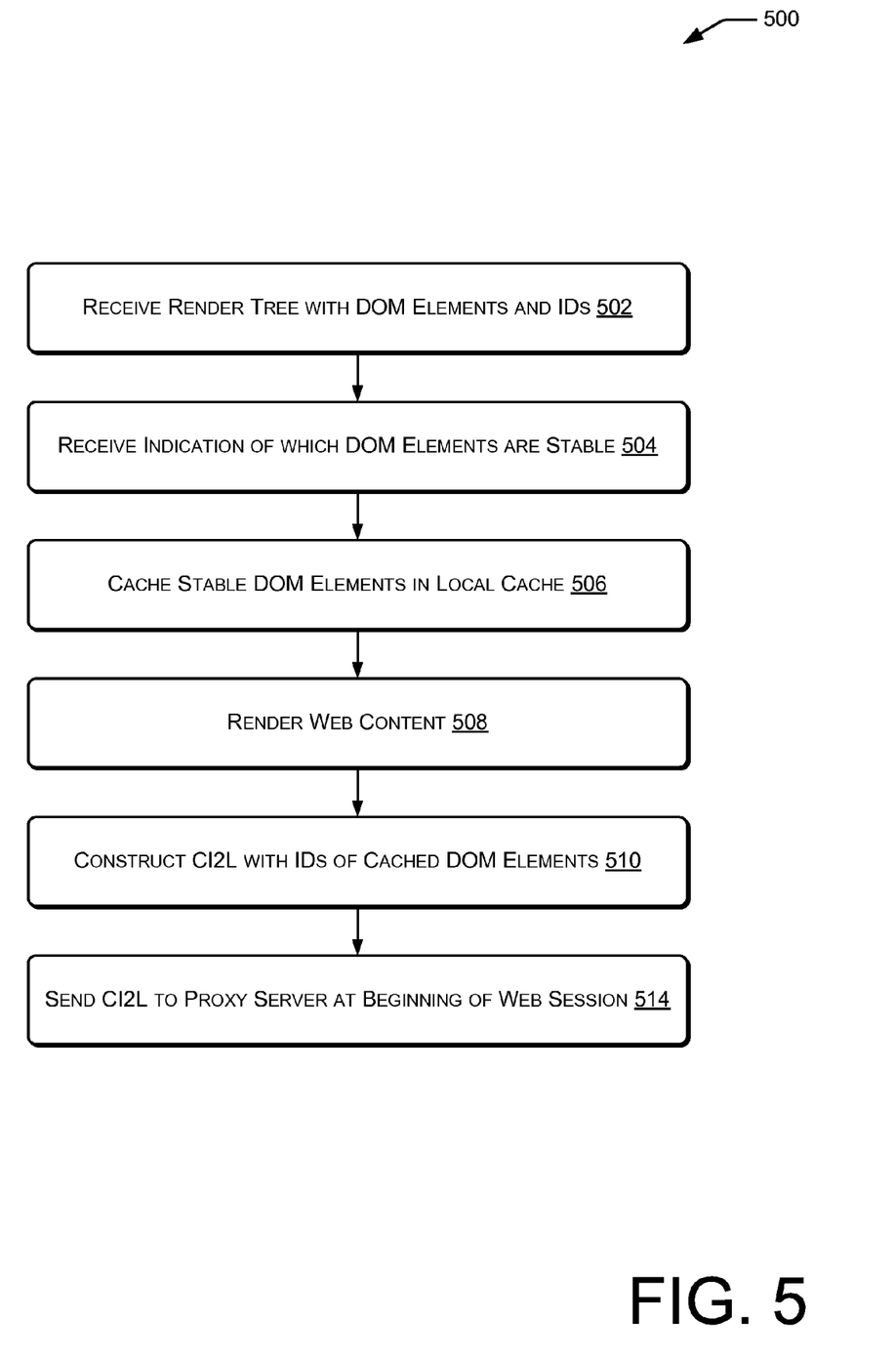
FIG. 5 is a flowchart illustrating details of a method for implementing a CRC-Browser in a client device.
Figure 6:
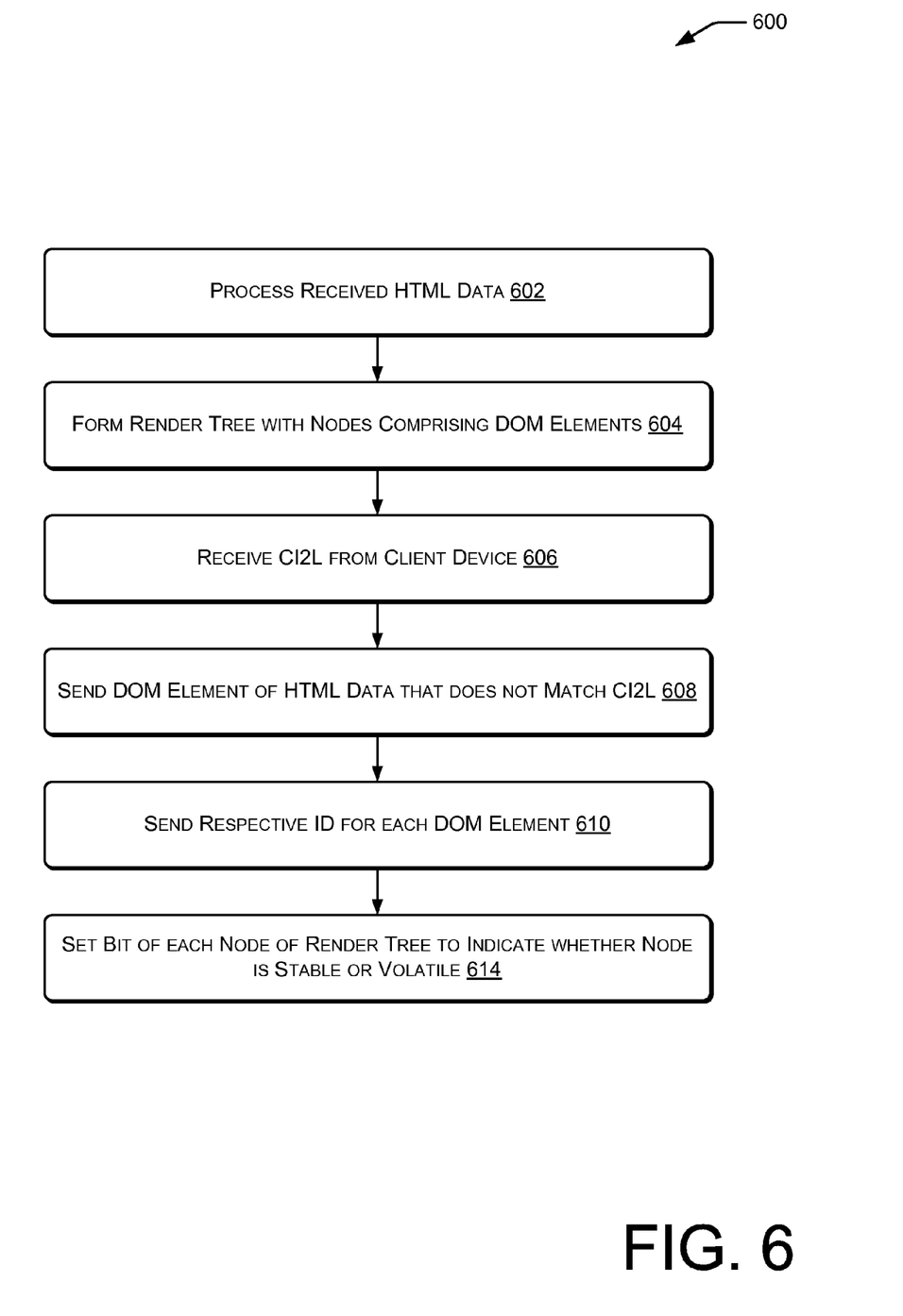
FIG. 6 is a flowchart illustrating details of a method for implementing a proxy server that may cooperatively manage cached content with a CRC-Browser of a client device.

FIGS. 5 and 6 are flow diagrams of illustrative processes 500 and 600 for implementing a CRC-Browser on a client device and a cooperatively managed proxy server, respectively, as described with reference to FIGS. 1-4. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates an example flow diagram of process 500 for implementing a CRC-Browser on a client, as discussed above. In one example, the illustrative, client device 104 of FIG. 1 and/or the illustrative, client device 204 of FIG. 2 may perform any or all of the operations of process 500.

In this particular implementation, the process 500 may begin at block at block 502 of FIG. 5 in which the process 500 may obtain a CI2L with IDs of cached DOM elements. In some instances, CI2L may be obtained by retrieving from a local cache. In additional instances, the CI2L may only include IDs of DOM element images that are cached locally. Additionally, at block 504, the process 500 may send the CI2Ls to the proxy server at the beginning of a Webpage session. Further in one example, the sending of CI2Ls to the proxy server may be carried out by the server synchronization module 322 of FIG. 3.

At block 506 of FIG. 5, the process 500 may receive rendering trees with DOM element images and IDs. As discussed above, the rendering trees may include rendering information of DOM elements that may be rendered on a display, such as display 214 of FIG. 2. Additionally, the IDs may be hashes calculated by a proxy server that sends the rendering trees as well. At block 508, the process 500 may also receive an indication of which DOM elements are stable and/or visible. In one example, a status bit of the DOM node will be set, by the proxy server, to make this indication. Additionally, in one example, the indication will inform the client device to cache the element image.

At block 510, the process 500 may cache the indicated stable DOM elements in a local cache, such as local cache 234 of FIG. 2 which may also be a part of client memory 302 of FIG. 3. In one example, the caching may be carried out by the caching module 320 of FIG. 3.

At block 512, the process 500 may render the Web content on a display of the client device, such as via one of the output devices 314 of FIG. 3. At block 514, the process 500 may synchronize information such as CI2Ls, rendering trees, and indexes of DOM element images, with proxy server.

FIG. 6 illustrates an example flow diagram of process 600 for implementing a proxy server that is cooperatively synchronized with a CRC-Browser of a client device, as discussed above. In one example, the illustrative, proxy server 108 of FIG. 1 and/or 206 of FIG. 2 may perform any or all of the operations of process 600.

In this particular implementation, the process 600 may begin at block 602 of FIG. 6 in which the process 600 may receive URL requests from a client device. In some embodiments, the process 600 may receive additional information such as CI2Ls at block 602. In one example, the CI2Ls may indicate what DOM elements have their rendered images cached at the client device so that the proxy server does not redundantly send the DOM element images that already reside locally at the client device. At block 604, the process 600 acquires the Web content in responding the received URL requests made by a client device, such as client device 204 of FIG. 2. At block 606, the process 600 may parse the received Web data and construct DOM trees made of DOM nodes. At block 608, the process 600 may construct rendering trees with nodes comprising the rendering objects associated with corresponding DOM elements. In one example, a rendering tree may be a subset of the DOM tree created by the proxy server and only includes the visible DOM nodes. In some examples, the process 600 may apply style formatting and compute additional rendering information of DOM elements of a DOM tree in construction a render tree. In more examples, the process 600 may calculate hashes (which can be used as IDs) for the rendered image of each DOM node. Additionally, in one example, the processing and forming of rendering trees may be performed by the browser engine module 418 of FIG. 4.

At block 610, the process 600 may send the rendered images of new or modified DOM elements of HTML data that does not match the CI2L. In other words, the proxy server may compare the ID of each new DOM element image to the IDs contained in the CI2L to determine whether there is a match. In one aspect, the proxy server will only send DOM element images that have IDs that do not match any IDs of the CI2L. Additionally, in some aspects, the comparison may be performed by the CI2L comparing module 422 of FIG. 4.

At block 612, the process 600 may also send respective IDs for each DOM element image sent at block 608. In this way, the CI2Ls can be updated with the IDs of the newly cached, or soon to be newly cached, DOM elements. In some instances, the sending of DOM elements and the sending of IDs of blocks 608 and 610, respectively, may be performed by the client synchronization module 420 of FIG. 4. Additionally, at block 614, the process 600 may set a status bit for each node of the rendering tree to indicate whether the node is stable or volatile. As noted above, this bit setting function is usable to indicate to the client device which DOM elements should be cached. At block 616, the process 600 may maintain the information synchronized with the client device. This synchronized information may include CI2Ls, dynamic indexes of DOM element images.

Illustrative methods and systems of implementing a CRC-Browser and a cooperatively managed proxy server are described above. Some or all of these systems and methods may, but need not, be implemented at least partially by architectures such as those shown in FIGS. 1-4 above.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
   a proxy server comprising:
      server memory and one or more server processors communicatively coupled to the server memory;
      a browser engine module, stored in the server memory and executable on the one or more server processors, to:
         process preprocessed Web content by producing a processed document object model (DOM) element and associating a corresponding identifier (ID) with each DOM element of the preprocessed Web content, the preprocessed Web content stored in a cache that uses a least recently used aging mechanism to remove portions of the preprocessed Web content from the cache,
         drop, from a rendering tree, at least one DOM element in response to determining that the at least one DOM element is not visible when rendered, each node of the rendering tree including rendering information comprising a z-coordinate of each DOM element and a status bit to indicate whether each DOM element is stable or volatile, and
         transmit the processed preprocessed Web content to the client device; and
      a client synchronization module, stored in the server memory and executable on the one or more server processors, to synchronize with a client device.

2. The system of claim 1, the transmitting of the processed preprocessed Web content comprising:
   sending the processed DOM element; and
   sending the corresponding ID to the client device.

3. The system of claim 2, the producing of the processed DOM element comprising producing a rendered DOM element image.

4. The system of claim 1, further comprising:
   a client device comprising:
      client memory and one or more client processors communicatively coupled to the client memory; and
      a Web browser to present content, stored in the client memory and executable on the one or more client processors, comprising:
         a caching module to:

cache processed Web content in a client cache of the client memory; and a server synchronization module to synchronize with a proxy server, the synchronizing with the proxy server comprising sending information on the processed preprocessed Web content cached at the client cache to the proxy server.

5. The system of claim 4, the information on cached processed preprocessed Web content comprising a list of IDs of processed DOM elements cached in the client cache.

6. The system of claim 5, the processed DOM element comprising a rendered image of the processed DOM element.

7. The system of claim 4, the synchronizing with the client device comprising sending an update to the client device that the server has previously obtained information on the processed preprocessed Web content, updating the information, and maintaining the information.

8. The system of claim 7, the sending of the update comprising sending, by the proxy server, an update of the rendering tree, a new or changed DOM element image with the corresponding ID and the information comprising one or more IDs or indexes of the DOM element image.

9. The system of claim 4, further comprising an ID comparing module, stored in the server memory and executable on the one or more server processors, to compare each produced ID with each entry in the list of IDs of processed DOM elements cached and stored at the client device.

10. One or more computer-readable storage media storing computer-executable instructions that, when executed by a processor of a client device, perform acts comprising:

sending, to a proxy server, information to indicate previously processed Web content in a local cache, the information comprising a list of identifiers (IDs) of processed document object model (DOM) elements that are cached locally, each ID of the list of IDs comprising a hash code, the previously processed Web content comprising a rendering tree in which each node of the rendering tree includes rendering information comprising a z-coordinate of each of the DOM elements and a status bit to indicate whether each of the DOM elements is stable or volatile;

removing at least a portion of the previously processed Web content from the local cache using a least recently used aging mechanism;

receiving, from the proxy server, newly processed Web content;

caching the newly processed Web content; and rendering content based at least in part on one or more of the previously processed Web content locally cached or the newly processed Web content from the proxy server.

11. The one or more computer-readable storage media of claim 10, the processed Web content locally cached comprising rendered images of DOM elements with associated IDs.

12. The one or more computer-readable storage media of claim 11, the processed Web content received from the proxy server further comprising at least one of an update to the rendering tree, a new DOM element image with associated IDs, or a changed DOM element image with associated IDs.

13. The one or more computer-readable storage media of claim 11, further comprising receiving, from the proxy server, an indication of stability of each DOM element image; the caching of DOM element images in a local cache being based at least in part on a received indication of new or updated DOM element images.

14. The one or more computer-readable storage media of claim 10, further comprising synchronizing, with the proxy server, a list of IDs of DOM elements, rendering trees, and/or states.

15. The one or more computer-readable storage media of claim 10, the rendering of the content comprising rendering DOM element images from a background to a foreground.

16. A method comprising:

under control of one or more computing devices configured with executable instructions, processing Web content to form a rendering tree based at least in part on the Web content, each node of the rendering tree representing a visible document object model (DOM) element, each node including rendering information comprising a bounding box of the DOM element, a z-coordinate of the DOM element, a reference to a rendered image of the DOM element, and a status bits to indicate whether the DOM element is stable or volatile, the Web content stored in a cache that uses a least recently used aging mechanism to remove portions of the Web content from the cache; and synchronizing the rendering tree with a client device.

17. The method of claim 16, the rendering tree comprising one or more nodes, each node comprising a document object model (DOM) element, and the synchronizing of the rendering tree with the client device comprising:

receiving a list of IDs of client-device-cached rendering objects from the client device; and sending, to the client device, an update to a rendering tree and/or a rendering object of the Web content of which an ID does not match an ID in the received list of IDs.

18. The method of claim 17, further comprising sending, to the client device, a respective identifier (ID) for each sent rendering object.

19. The method of claim 17, further comprising:

setting an indication of stability of each node of the rendering tree; and sending the stability indications to the client device.

* * * * *